Dec. 11, 1956 H. G. KLEMM 2,773,369
TORQUE LIMITING DEVICE FOR TRACTOR
Filed March 9, 1954 2 Sheets-Sheet 1

INVENTOR.
HERMAN G. KLEMM
BY
Carlsen, Pitzner, Hubbard + Wolfe
ATTORNEYS.

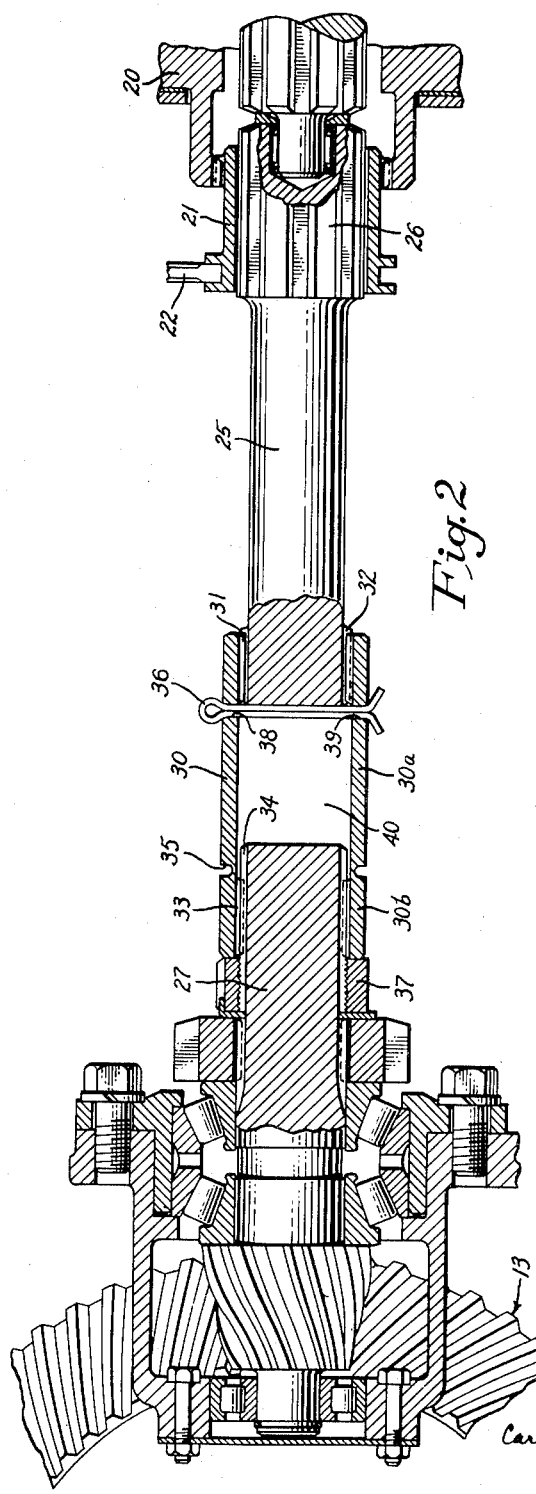
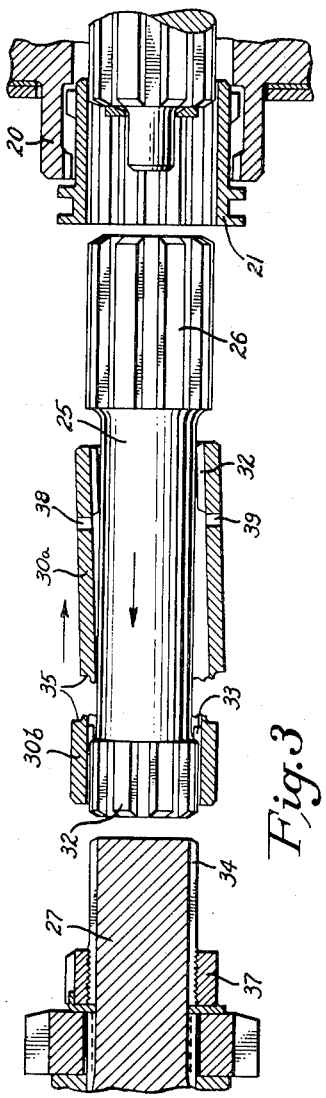

United States Patent Office 2,773,369
Patented Dec. 11, 1956

2,773,369

TORQUE LIMITING DEVICE FOR TRACTOR

Herman G. Klemm, Birmingham, Mich., assignor, by mesne assignments, to Massey-Harris-Ferguson Inc., Racine, Wis., a corporation of Maryland Application March 9, 1954, Serial No. 414,923

5 Claims. (Cl. 64—28)

The present invention relates to tractors and more particularly to safety means for limiting the torque transmitted from the tractor transmission to the rear wheels.

It is an object of the present invention to provide a novel safety device for use in combination with a low-speed high-torque transmission which positively breaks the driving connection upon reaching a predetermined limiting value of torque. It is another object to provide a torque limiting element which is so arranged as to sever cleanly upon exceeding the limit value of torque, with the severed pieces thereof being securely locked in place until a new element is substituted.

It is a further object to provide a torque limiting device which permits the maximum torque to be predetermined with a high degree of accuracy. It is a still further object to provide a torque limiting element which is unaffected by normal heavy use of the tractor within its torque rating. Finally, it is an object to provide a torque limiting device which is inexpensive, which is applicable to both new and existing tractors, and in which the torque limiting element may be replaced quickly and easily with minimum outage time and without the aid of a mechanic.

Other objects and advantages of the invention will be apparent from reading the attached detailed description and upon reference to the drawings in which:

Fig. 2 is a fragmentary view in partial section showing a shear sleeve constructed in accordance with the present invention in position for coupling together the driving and driven shafts.

Fig. 3 shows the manner in which the parts are telescoped together for removal and replacement of the shear sleeve.

Figure 1:
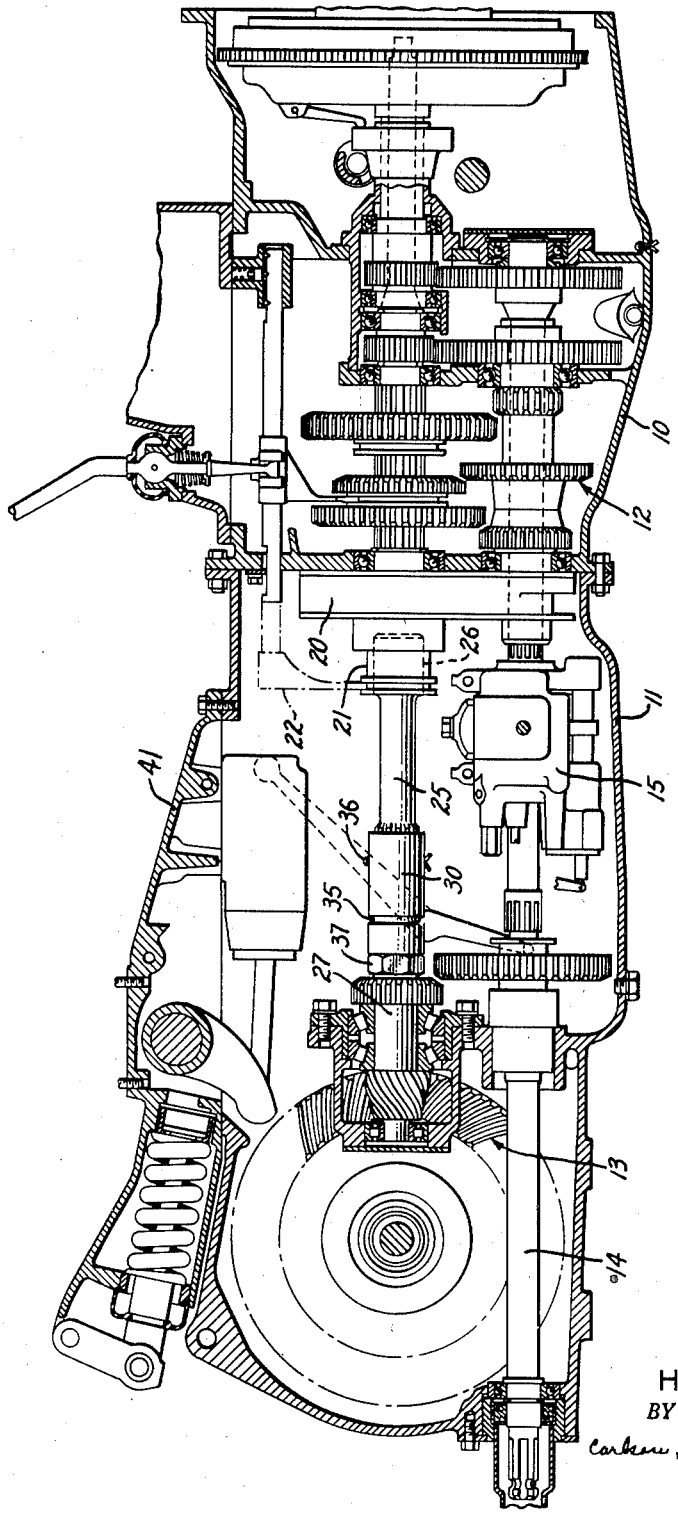
Figure 1 is a vertical section taken through the rear end portion of a tractor showing the tractor transmission and the associated torque limiting device constructed in accordance with the present invention.

While the invention has been described in connection with the preferred embodiment it will be understood that the invention is not limited thereto and that I intend to include all modifications and alternative constructions falling within the spirit and scope of the appended claims.

Turning now to Fig. 1, there is shown a tractor center housing having a forward portion 10 and a rear portion 11 rigidly bolted together. The forward portion includes a tractor transmission 12; the rear includes a differential 13, a power take-off shaft 14 and a power lift mechanism (only partly shown) powered by an hydraulic pump 15. Included within the housing and coupled to the transmisison 12 is a sun-and-planet speed reduction unit 20, having a control sleeve 21 which is shiftable between two operating positions by a manual operator 22. For further discussion of the transmission and speed reduction unit, reference may be made to my copending application Serial No. 419,652, filed March 30, 1954. It will suffice to say that the combination of the planetary reduction unit 20 and the transmission produce a total of six forward speeds, the lowest of which is capable of exerting extremely high torque as the tractor crawls slowly forward.

The output of the planetary reduction unit is coupled to a drive shaft 25 having a splined connection 26 at its forward end. Alined with the drive shaft 25 is a driven shaft 27 which is connected to the tractor differential 13.

In practicing the invention a shear sleeve is coupled to the adjacent ends of the drive shaft and driven shaft and has a portion cut away intermediate its ends to provide a weakened shear zone normal to the axis of the sleeve. In the exemplary embodiment, the shear zone is provided by a narrow annular groove cut in the peripheral wall of the sleeve to localize the stress so that the sleeve is sheared cleanly into two parts in a plane substantially perpendicular to the axes of the shafts when a predetermined limiting torque is reached. In the present embodiment the shear sleeve indicated at 30 is telescoped over the ends of the two shafts and has a splined connection with each of them. Referring to Fig. 2, the sleeve 30 has a first set of internal splines 31 at its forward end which mate with external splines 32 on the drive shaft and is provided with a similar set of splines 33 at its rear end mating with external splines 34 on the driven shaft. In accordance with the present invention a narrow annular groove 35 is formed in the shear tube between the two splined connections and overlapping one of the shafts, the sleeve being prevented from moving endwise in either direction, so that when shearing takes place at the groove the two portions of the sleeve 30a, 30b continue to be supported on the same shaft. More specifically, it will be seen in Fig. 2 that the groove 35 is spaced inwardly relative to the end of the shaft 27 so that the forward portion 30a of the sleeve overlaps the shaft, the sleeve being positively held in such position by a cotter pin 36 at its right hand end and by a shoulder on a nut 37 at its left hand end.

After shearing takes place the end of the shaft 27 serves as a spindle for the forward portion 30a of the sleeve, which continues to rotate idly thereon until the transmission is restored to neutral. Since both parts remain whole and are locked axially in place there are no loose or broken parts to fall to the bottom of the housing to jeopardize the gearing or other moving parts. Moreover, the shearing takes place in a plane normal to the axis of the sleeve so that there are no projections on the sleeve sections to catch and transmit torque. It will be noted that the cotter pin 36, which extends through alined holes 38 and 39 in the sleeve adjacent the rear end of the drive shaft 25, not only locks the sleeve in place, but also keeps the drive shaft seated in the spline connection 26 at its forward end. The cotter pin is not, however, subject to wear during normal operation since there is no axial component of driving force.

In the preferred embodiment the groove 35 extends through the major portion of the wall thickness and the root of the groove is arcuate to further concentrate the shearing stress, so that the shearing is localized at the root of the groove. It will be noted that all of the connective material at the point of minimum cross section is at substantially the same large radius from the center of the shaft and is therefore stressed uniformly as compared to the non-uniform stressing of the type which occurs when torque is applied to a solid shaft. Knowing the shear stress required for rupturing the material used, the desired thickness may be very simply ascertained. The thickness may, if desired, be determined empirically by making up a set of shear sleeves for test purposes having different depths of groove, the torque required to produce shearing failure being ascertained directly on a torque testing machine. Since the material along the shearing plane is uniformly stressed, and since abrupt change in cross section at the shearing plane is avoided in the present device, there is no tendency for the metal in the vicinity of the groove to "fatigue" even after long periods of use, with the result that the life is unlimited as long as the torque rating is not exceeded.

Shear sleeves constructed in accordance with the present invention may be manufactured with a high degree of uniformity enabling maximum torque to be achieved at the tractor rear wheels just short of that which may damage the driving system. The hazards usually inherent in the use of compounded transmissions are overcome and the user of the tractor may operate it without apprehension and without taking unusual precautions against overload.

In accordance with a further aspect of the invention the clearance, indicated at 40, provided at the rear end of the drive shaft exceeds the amount of spline engagement so the forward end, and the shaft are provided with an unobstructed shank portion so that the sleeve and shaft may be telescoped together for removal from the tractor. As shown in Fig. 3 the sleeve 30 is first pulled over the drive shaft; following this the drive shaft is pulled rearwardly into the clearance space 40 to disengage the splined connection 26, the drive shaft and sleeve then being free to be removed as a unit. To replace the sleeve, the process is reversed: a new sleeve is slipped over the drive shaft 25, the assembly is positioned as in Fig. 3, and the shaft and sleeve are then extended to operating position. Finally, the cotter pin 36 is inserted in the holes provided for it.

When breakage of the shear sleeve does occur access for replacement is provided simply by unbolting and removing the cover plate assembly indicated at 41, for quick substitution of a renewal sleeve without the aid of a mechanic and without any appreciable outage time.

In the following claims the term "splined connection" shall be understood to mean a torque-transmitting connection which may be disengaged by axial withdrawing movement.

I claim as my invention:

1. In a tractor having a low speed transmission the combination comprising a drive shaft, a driven shaft in alinement therewith, a metallic sleeve telescoped over said shafts and having a splined connection with each of them, said sleeve having a circumferential groove formed therein between said splined connections, disengageable means for preventing telescoping movement between said sleeve and either of said shafts, one of said shafts extending into said sleeve beyond said groove so that upon shearing of said sleeve at said groove both halves of said sleeve are maintained in their normal axial relation in place on said shafts.

2. In a tractor having a low speed transmission the combination comprising a drive shaft, a driven shaft in alinement therewith and axially spaced from said drive shaft, a metallic sleeve telescoped over said shafts and having a splined connection with each of them, said sleeve having a circumferential groove between the splined connections for localization of shearing stress and to induce shearing upon exceeding a predetermined limiting torque, and said groove being located so that one section of the sleeve extends bridgingly over both shafts for maintaining the two resulting portions of the sleeve in alinement with one another subsequent to shearing thereof.

3. In a tractor having a low speed transmission the combination comprising a drive shaft, a driven shaft in alinement therewith and axially spaced from said drive shaft, a metallic sleeve telescoped over said shafts and having a splined connection with each of them, said sleeve having a circumferential groove between the splined connections for localization of shearing stress and to induce shearing upon exceeding a predetermined limiting torque, one of said shafts extending into said sleeve beyond said groove for maintaining the two resulting portions of the sleeve in alinement with one another subsequent to shearing thereof.

4. In a tractor having a low speed transmission the combination comprising first and second shafts in alinement with one another for transmitting torque to the tractor rear wheels, a metallic shear sleeve telescoped over the ends of both of said shafts and having a splined connection with each of them, said sleeve having a circumferential groove between said splined connections, said first shaft having an unobstructed shank portion to enable substantially the entire length of said shear sleeve to be telescoped thereover, said first shaft having a splined mounting at its opposite end and said shafts being axially spaced from one another to provide clearance space between them so that said first shaft may be axially withdrawn from its splined mounting and into said clearance space and removed with said sleeve telescoped thereon for replacement of said sleeve, and means on said sleeve for axially locking said first shaft seated in its splined mounting to prevent relative telescoping thereof under normal running conditions.

5. For use in a tractor having a speed change transmission with a power delivery shaft axially alined with a driven shaft, a coupling element for drivingly connecting said shafts, comprising a metallic sleeve dimensioned to telescope over the adjacent ends of said shafts and having means at opposite ends for effecting driving engagement with the respective shafts, and said sleeve having a portion cut away to define a zone of reduced cross section intermediate the ends of the sleeve effective when the torque transmitted by the sleeve exceeds a predetermined value to induce fracture of the sleeve in a plane substantially at right angles to the axis of the sleeve, said zone being located so that one section of the fractured sleeve extends over both of the shafts to maintain both sections in place on the shafts.

References Cited in the file of this patent

UNITED STATES PATENTS 724,684    Edwards _____ Apr. 7, 1903